(12) United States Patent
Schafer

(10) Patent No.: US 7,699,487 B2
(45) Date of Patent: Apr. 20, 2010

(54) TELESCOPIC LIGHT BASE FOR COUPLING TO DIVERSE PLANT CONTAINERS

(76) Inventor: Steven R. Schafer, 11045 53$^{rd}$ Ave. N., Plymouth, Hennipen, MN (US) 55442

( * ) Notice: Subject to any disclaimer, the term of this patent is extended or adjusted under 35 U.S.C. 154(b) by 109 days.

(21) Appl. No.: 11/864,496

(22) Filed: Sep. 28, 2007

(65) Prior Publication Data

US 2009/0086470 A1 Apr. 2, 2009

(51) Int. Cl.
*F21S 6/00* (2006.01)
(52) U.S. Cl. .................. 362/122; 362/413; 362/414; 362/805; 47/39
(58) Field of Classification Search ............ 362/122, 362/410, 413, 414, 418, 431, 154, 432, 805; 47/39, 66.6; 248/121
See application file for complete search history.

(56) References Cited

U.S. PATENT DOCUMENTS

| | | | |
|---|---|---|---|
| 1,419,152 A | | 6/1922 | Lansing et al. |
| D234,221 S | | 1/1975 | Upchurch |
| D242,941 S | | 1/1977 | Nagata |
| 4,349,864 A | | 9/1982 | Smith |
| D277,511 S | | 2/1985 | Patel |
| D323,794 S | | 2/1992 | Wianecki |
| 5,320,319 A | * | 6/1994 | Winger et al. ............ 248/312.1 |
| 5,430,972 A | * | 7/1995 | Wianecki .................... 47/66.6 |
| 5,741,061 A | | 4/1998 | Lehmann et al. |
| 5,860,248 A | | 1/1999 | Peters |
| 5,951,154 A | | 9/1999 | Carel et al. |
| 6,230,437 B1 | * | 5/2001 | Wolverton et al. ............. 47/39 |
| D448,510 S | | 9/2001 | Milicia |
| 6,776,511 B1 | | 8/2004 | Lindsay |
| 2003/0016532 A1 | * | 1/2003 | Reed ......................... 362/198 |
| 2006/0112633 A1 | * | 6/2006 | Humphrey et al. .......... 47/66.6 |
| 2008/0266836 A1 | * | 10/2008 | Hadley ...................... 362/101 |

FOREIGN PATENT DOCUMENTS

| | | |
|---|---|---|
| GB | 2230684 A | 10/1990 |
| JP | 6217645 A | 8/1994 |

* cited by examiner

*Primary Examiner*—Stephen F. Husar
*Assistant Examiner*—Peggy A. Neils
(74) *Attorney, Agent, or Firm*—Albert W. Watkins

(57) ABSTRACT

A telescopic light base couples decorative light fixtures to a flower pot or other similar container. The decorative light fixture may then be used to illuminate the contents of the pot. The telescopic light base has a ground-engaging pad upon which the pot rests. The weight of the pot then serves to anchor the telescopic light base in place. A telescopic pole support of variable length is coupled at a first end to the ground-engaging pad. At an end of the telescopic pole support distal to the ground-engaging pad, a pot upper rim retention arm is provided which operatively passes within the pot sidewalls. Adjacent to the pot upper rim retention arm is a lamppost connector. The telescopic pole support may be contracted to capture a pot between the ground-engaging pad and pot upper rim retention arm, and then later expanded and separated from the pot.

11 Claims, 3 Drawing Sheets

TELESCOPIC LIGHT BASE FOR COUPLING TO DIVERSE PLANT CONTAINERS

BACKGROUND OF THE INVENTION

1. Field of the Invention

This invention pertains generally to illumination, and more particularly to an apparatus for illuminating a pot containing flowers, plants or simulations thereof. In one preferred embodiment, a telescopic light base couples to a flower pot of indeterminate size, while safely and securely supporting a light for ornamental illumination of the flower pot and contents.

2. Description of the Related Art

Illumination was likely purely utilitarian in the earliest times, when fire was revered for heat, warmth, the illumination of caves and other dark areas, and extension of daylight. However, and particularly with the advent of electric lights, there has been a marked and extensive blending of utilitarian functions with artistic, ornamental, or otherwise attractive and pleasant illumination.

The blending of function is apparent in the illumination of plants, flowers, and simulations thereof. A number of artisans have combined illumination with plants in containers, as illustrated for exemplary purposes in U.S. Pat. No. 1,419,152 by Lansing et al, entitled "Electric flower lamp;" Des 234,221 by Upchurch, entitled "Lamp or the like;" Des 242,941 by Nagata, entitled "Combined lamp and planter or similar article;" and Des 323,794 by Wianecki, entitled "Combined planter and lamp;" the teachings of each which are incorporated herein by reference. While suitable for plant ornamental and perhaps utilitarian illumination, depending upon the design, each of these incorporate a pot of particular size and geometry directly into the construction of the light fixture. Consequently, it is impossible to apply the same light fixture to a different pot volume or geometry. Also, the combination of pot directly with stand makes the assembly somewhat larger and more difficult to both ship and inventory. Finally, in the event of a need for service or other need to access or remove the light fixture, the pot must first be emptied of dirt and plants.

Other artisans have added ornamental illumination through lights incorporated directly into or supported on the pot. Exemplary of this technique, and incorporated herein by reference, are U.S. Pat. Nos. 4,349,864 by Smith, entitled "Lighted plant stand;" 5,741,061 by Lehmann et al, entitled "Light-up planter;" 5,951,154 by Carl et al, entitled "Illuminating box-shaped planter with light assembly, light element channel, and glass panel for multidirectional lighting;" United Kingdom patent application 2,230,684 A by Hall, entitled "Illuminated plant holder;" and Japanese laid-open application 6-217645 A by Matsuzaki et al, entitled "Ornamental pot". A number of these patents provide interesting and ornamental up-lighting of plants within the pot, but these suffer from the similar limitation of being restricted to the pot for which the lighting was designed or is fitted with. Furthermore, while up-lighting provides artistic effect with grasses and other ornamental plants, flower blossoms and some other plants tend not to be effectively displayed by upward illumination. Finally, many of these incorporate the lights adjacent the top rim of the pot, but the lights used will also directly illuminate the pot wall. Consequently, attention is not only drawn to the pleasant plant above the pot upper edge, but also and in many cases more intensely down to the pot. As may be apparent, in many instances it is undesirable to illuminate the pot and not more intensely illuminate the plant above.

Another U.S. Pat. No. 5,860,248 by Peters, entitled "Planter hanger," the teachings which are incorporated herein by reference, illustrates a plant hanger with an illuminating light above the pot. This patent provides a more universal adaptation to diverse pots than much of the prior art described herein above, though being limited to small pots and locations providing sufficiently secure anchoring to permit the pot of chosen size to be safely suspended.

In other known instances, a designer will install a light fixture in a particular location upon a building, such as on a wall or the like, and illuminate one or more plants adjacent the building-mounted light. While commonly used, and suited to any type of pot, this approach is limited to locations where suitable building structure exists. Furthermore, the cost of installation is very high, and the ability to rearrange does not practically exist, since the fixture must be relocated at great expense. Finally, with structural installations it is much more difficult to illuminate just one plant, and instead a larger general area is illuminated, even when well-focused reflector bulbs are employed.

Without the structural installation, lamp poles of the prior art are simply too top-heavy and readily tipped to be safely and reliably used with prior art pots. Nevertheless, there are a variety of known lighting structures and fixtures which are exemplary of those used or readily coupled with lamp posts or poles, including for exemplary purposes and not limiting thereto U.S. Pat. No. 6,776,511 by Lindsay, entitled "Structures for lighting fixtures;" Des 277,511 by Patel, entitled "Outdoor light;" and Des 448,510 by Milicia, entitled "Outdoor lighting fixture;" the contents of each which are incorporated herein by reference.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a telescopic light base which couples a decorative light fixture to a diverse plant container so that the decorative light fixture may then illuminate a content of the diverse plant container. A ground-engaging pad has a plant container support. A telescopic support is variable in length, and coupled at a first end to the ground-engaging pad. A pot upper rim retention arm is coupled with the telescopic support distal to the ground-engaging pad, and operatively passes within a sidewall of the diverse plant container when the telescopic support is contracted, to thereby capture the diverse plant container between ground-engaging pad and pot upper rim retention arm. The pot upper rim retention arm is extracted from within the diverse plant container sidewall when the telescopic support is expanded, to thereby release the diverse plant container. A lamppost connector is provided adjacent to the pot upper rim retention arm.

In a second manifestation, the invention is a method of capturing and illuminating a plant container. According to the method, a telescopic member is expanded between a base and a retaining arm. The plant container is brought to rest upon the base adjacent to the telescopic member, and the telescopic member is contracted between base and retaining arm. Responsive thereto, the retaining arm is engaged with the plant container. A lamp carried upon the telescopic member is energized.

In a third manifestation, the invention is a telescopic light base which couples a decorative light fixture to a diverse plant container, in further combination with the diverse plant container having a bottom, sidewalls and an open top, so that the decorative light fixture may then illuminate a content of the diverse plant container. A generally planar ground-engaging pad has a plant container top support surface. A telescopic pole support of variable length extends generally normal to the generally planar ground-engaging pad and is coupled at a first end to the ground-engaging pad. A pot upper rim retention arm is coupled with the telescopic support, distal to the ground-engaging pad, and is engaged with a sidewall of the diverse plant container when the telescopic support is contracted, to thereby capture the diverse plant container between ground-engaging pad and pot upper rim retention arm. The pot upper rim retention arm is disengaged from the diverse plant container sidewall when the telescopic support is expanded to thereby release the diverse plant container. A lamppost connector is provided adjacent to the pot upper rim retention arm; and a lamp is supported upon the telescopic support.

OBJECTS OF THE INVENTION

Exemplary embodiments of the present invention solve inadequacies of the prior art by providing a lamppost support base having a ground-engaging pad, a telescopic pole support, and a pot upper rim retention arm carried upon the telescopic pole support.

A first object of the invention is to provide illumination for containers of diverse size and contents, including but not limited to living plants, plant simulations and the like. A second object of the invention is to enable the illumination to be readily moved to different locations. Another object of the present invention is to provide a safe, secure and stable fixture which may be used indoors or out. A further object of the invention is to enable illumination to be focused upon desirable features of interest. Yet another object of the present invention is to provide a compact structure which is adapted to many diverse fixtures as well as diverse containers, and which may be readily manufactured, inventoried, and shipped.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
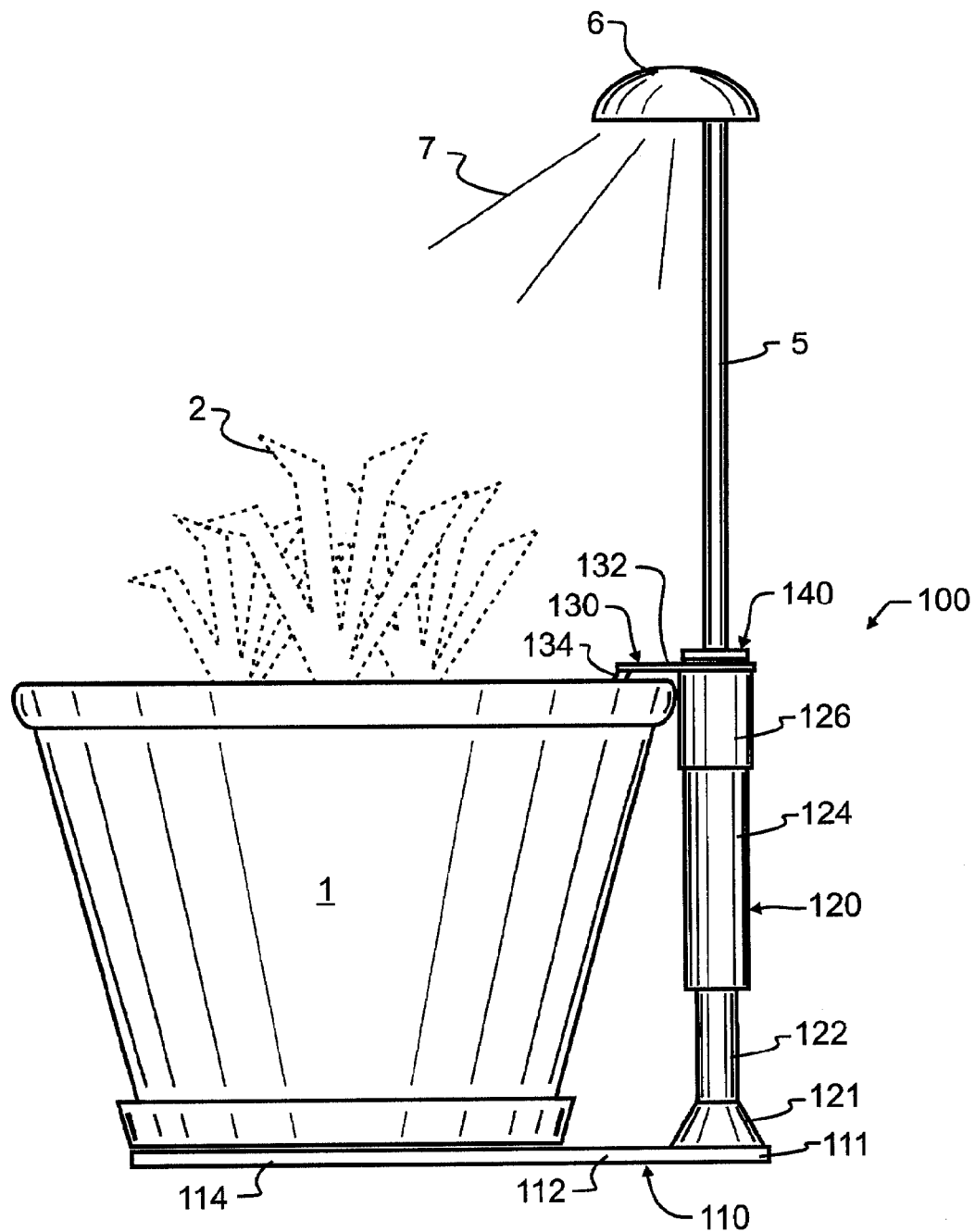
FIG. 1 illustrates a first preferred embodiment telescopic light base designed in accord with the teachings of the present invention, coupled to a plant container and suspending a light fixture over the plant container, from a side plan view.

Manifested in the preferred embodiment, the present invention provides a mobile support for a decorative light fixture. The fixture is readily associated and retained with a pot of diverse geometry, and may then be used to illuminate the contents of the pot. As illustrated in FIG. 1, a pot 1 of indeterminate shape, geometry and composition may contain therein a plant 2. also of indeterminate shape, geometry and composition. A light pole 5 is suspended adjacent to pot 1 and plant 2 by first preferred embodiment telescopic light base 100, and supports thereon a lamp 6 having downwardly projecting rays 7. The particular light pole 5 and lamp 6 are not critical to the present invention, and may comprise any of the myriad of designs commercially available, known or otherwise as illustrated in the Lindsay, Patel, and Milicia patents incorporated by reference herein above. Most preferably, telescopic light base 100 includes a lamppost connection 140 suitable for connecting to standard light poles 5, which for many manufactured light poles 5 would mean a threaded mechanical coupling such as internally threaded coupling 126 and suitable access to twist-on wire connectors or other suitable electrical connection. Additional features may be incorporated into lamppost connection 140, though not specifically illustrated, including joint packing, suitable gaskets, or other equivalent apparatus and methods to prevent or reduce an ingress of contaminants.

In addition to lamppost connection 140, telescopic light base 100 includes telescopic pole 120, which extends a variable distance between lamppost connection 140 and base 110. In preferred embodiment telescopic light base 100, a smaller diameter fixed rod-like member 122 is fixed in position upon base coupling member 121, and a larger diameter sleeve 124 slides co-axially and generally concentrically about rod-like member 122. Member 122 is referred to herein as being rod-like, since the important characteristic is the elongate consistent exterior geometry, which permits a member such as larger diameter sleeve 124 having a larger internal dimension than the external geometry of member 122 to telescope thereabout. While in the preferred embodiment telescopic light base 100, rod-like member 122 and sleeve 124 are illustrated as being generally cylindrical, it will be understood that rectangular, other polyhedron or even other cross-section geometries may be used, and rod-like member 122 is not even required to have the same exterior shape as the interior of sleeve 124 to permit suitable telescoping therebetween. The cylindrical geometry illustrated in FIG. 1 simply illustrates one preferred embodiment. For increased strength, aesthetics, and improved moisture shedding, base coupling member 121 is illustrated as an inverted cone, though once again, there are a virtually limitless number of geometries which may be used.

Adjacent to lamppost connection 140 is a pot clamp 130 which couples with and extends transverse from telescopic pole 120 at coupler member 132. Pot clamp 130 then turns in a direction more parallel to telescopic pole 120 than coupler member 132 and holding arm 134. Holding arm 134 is designed to slide down and into an interior of pot 1 until coupler member 132 interferes with pot 1. Once so positioned, pot 1 is captured internally by holding arm 134, along a top rim by coupler member 132, and along the outer wall by telescopic pole 120. Completing the capture of pot 1 is base 110, which rigidly couples to base coupling member 121 at telescoping pole base plate 111. Additional springs, friction devices such as simple bushings or the more elaborate clamps commonly found on camera tripod stands and the like, pneumatic or hydraulic cylinders and suspensions such as found on chairs and in automotive bottle jacks, or any other suitable locks or means to urge or lock telescopic pole 120 in a direction or position are contemplated herein for use. However, the simple forces of gravity and friction which arise between the various illustrated components will, for most applications, suffice to capture pot 1 and maintain light pole 5 in a vertical orientation.

Figure 4:
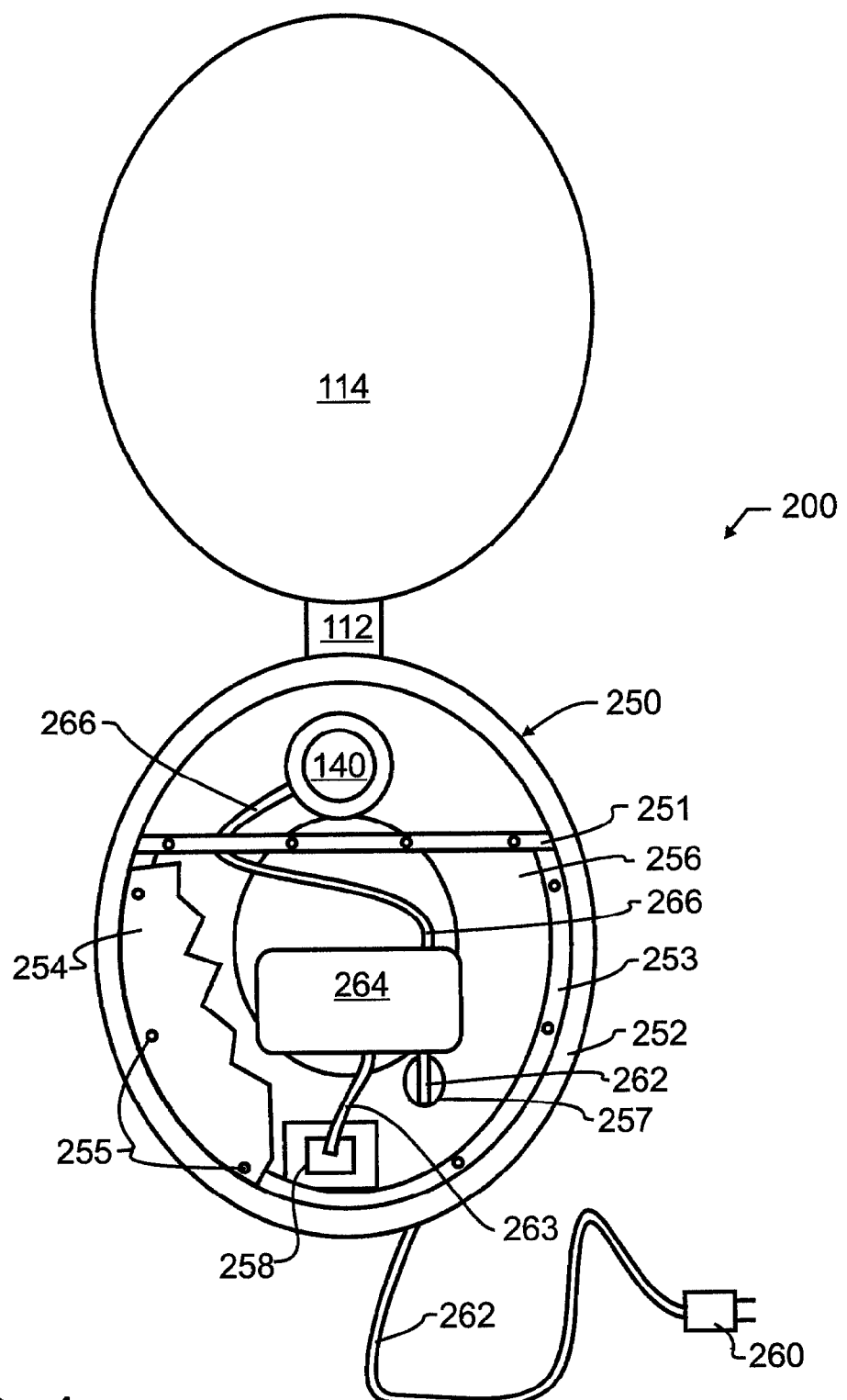
FIG. 4 illustrates the second preferred embodiment telescopic light base of FIG. 2 from a top plan view, with an enclosing and weatherproofing cover partially cut away.

From telescoping pole base plate 111, base 110 then extends through a narrow neck region 112 to a larger pot base plate 114. The specific geometries for each portion of base 110 is not critical, though it is preferable for aesthetic appearance, weight and materials to use a relatively small telescoping pole base plate 111 and an even smaller neck 112. Pot base plate 114 in the preferred embodiments, as shown for exemplary purposes in FIG. 4, is somewhat oval to accommodate a wide variety of pot diameters or shapes, though again any suitable shape and dimension which provides good support for both pot 1 and resistance to motion therewith is suitable. Too narrow a strip will lead larger pots 1 to rock when even gently disturbed on such a strip, while too large a size for pot base plate 114 will adversely affect visual appearance, packaging size and weight, and aesthetic appearance when a smaller pot is supported thereon.

In the preferred embodiment, base 110 is fabricated from a single sheet or plate, but again there is no requirement for the same. Instead, base 110 may be fabricated from many diverse geometries, including but not limited to perforate or otherwise inconsistent materials, and may be textured, or otherwise have an irregular surface as may be desired. Additionally, rather than being a single integral plate, it is further contemplated herein that provision may be made for pot base plate 114 to slide or be moved transversely to the longitudinal axis of telescopic pole 120, such as by overlapping more or less with neck 112.

While not specifically illustrated in FIG. 1, it will be recognized by those skilled in the art that an electrical cord may be provided which will ultimately connect to lamp 6. The source of energy for lamp 6 may be determined by the intensity of light desired and the environment which telescopic lamp base 100 has been designed for. In the preferred embodiment, telescopic lamp base 100 is designed for exterior illumination of reasonably large pots, so an AC line plug would typically be plugged into a 120 VAC wall socket. The 120VAC is next typically passed through a transformer, to yield a low voltage output such as a 12 Volt output. The lower voltage is safer in the exterior environment, and the use of a transformer can isolate the circuit from ground, providing even greater safety. Additionally, this circuit will normally remain operational independent of temperature. The 12 Volt AC output is then coupled to one or more telescopic lamp base units 100. In this embodiment of FIG. 1, such a transformer might, for exemplary purposes only and not limited thereto, be placed directly within telescopic pole 120. Nevertheless, and as is well known in the art of exterior illumination, other placements of transformers and other sources of power such as but not limited to electronic transformers, solar panels, and batteries may also or alternatively be used. Likewise, the particular type and nature of bulb used within lamp 6 will readily be determined by one reasonably skilled in the art, in consideration of the power source and capacity, desired illumination intensity, illumination pattern, color temperature, operating conditions, desired safety, and other operating parameters too numerous to specifically list herein, but known to those skilled in the art.

Figure 2:
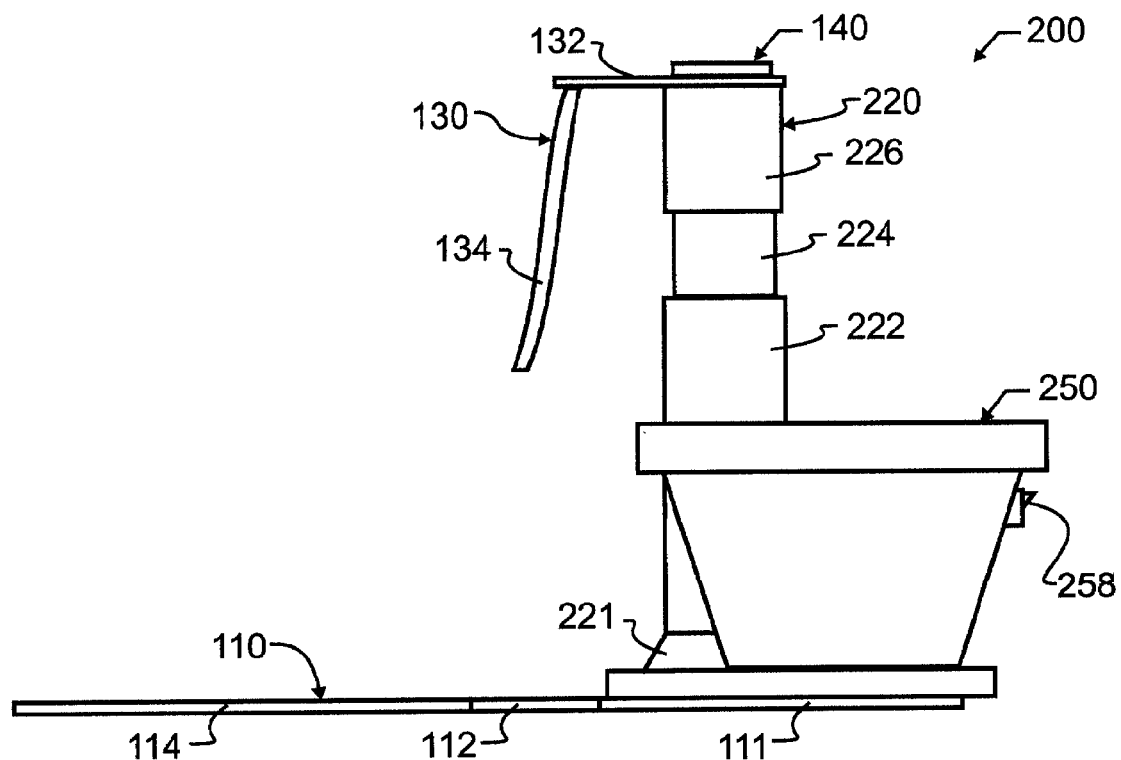
FIG. 2 illustrates a second preferred embodiment telescopic light base designed in accord with the teachings of the present invention from a side plan view.

FIG. 2 illustrates a second preferred embodiment telescopic light base 200 with a base 110, pot clamp 130, and lamppost connection 140 of like construction to first preferred embodiment telescopic light base 100. From this illustration, the angle and proportionate length of holding arm 134 are visible, though both may be varied depending upon the particular geometry of pot 1. In fact, where a slightly malleable material is used for the fabrication of holding arm 134, holding arm 134 may be bent to suit the needs of a particular pot geometry.

Between lamppost connection 140 and base 110, telescopic light base 200 differs from telescopic light base 100. First of all, rod-like member 224 slides within an inner diameter of sleeve 222, and so the arrangement of rod-like member and sleeve is inverted when compared with telescopic light base 100. This simply illustrates one of the many contemplated alternative constructions which will become apparent to those skilled in the art upon a reading of the present disclosure, each which are considered incorporated herein.

Additional aesthetic and functional benefit is obtained in telescopic light base 200 through the inclusion of a small pot 250. Pot 250, which will be better understood with reference to FIG. 4, has a top rim 252 which defines the upper edge. At some distance below top rim 252, by an amount which will be selected at the time of design by a designer, is cover plate 254, which in combination and cooperation with fasteners 255, lip 253, and divider wall 251 encloses and seals chamber 256. Passing through a sealed hole 257 formed in the wall of pot 250 is power cord 262, which extends between AC line plug 260 and transformer 264. A power switch 258 may be interposed between transformer 264 and AC line plug 260 through wire 263, to allow power to be disconnected through toggling of switch 258. A low-voltage output, such as 12 VAC, is conducted through wire 266 ultimately to lamp 6. Most preferably, the point at which wire 266 passes through divider wall 261 will also be sealed. As may be apparent, it is possible to completely seal transformer 264 and all high voltage components within chamber 256. If lip 253 is sufficiently below top rim 252, it will be possible to provide simulated or live plants within pot 250 above and isolated from chamber 256. Additionally, and where desired, one or more small drain or weep holes may be provided through the wall of pot 250 to the exterior thereof to permit excess moisture to pass from within pot 250 out therefrom, just as such holes are provided in ordinary plant pots today.

Figure 3:
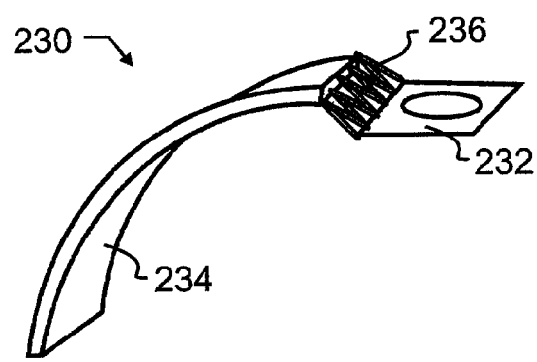
FIG. 3 illustrates an alternative embodiment pot clamp designed in accord with the teachings of the present invention from projected view.

FIG. 3 illustrates an alternative embodiment pot clamp 230 which is designed to accommodate a wider range of sizes and geometries of pots than pot clamp 130. More specifically, interposed between coupler member 232 and holding arm 234 is a spring 236, which may take any suitable geometry and composition. In this embodiment, holding arm 234 may have a much greater curvature than holding arm 134, and spring 236 will then permit movement to capture even very round pots, which might otherwise be difficult to capture with holding arm 134. Coupler member 232 closely resembles coupler member 132, other than any geometry necessary to couple with spring 236.

As should be apparent from the foregoing description, the present invention will accommodate a very wide range of component geometries, each which may be fabricated from many different types of materials, the selection which would be apparent to those reasonably skilled in the field upon review of the present disclosure. Consequently, while the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A telescopic light base which couples a decorative light fixture to a diverse plant container so that said decorative light fixture may then illuminate a content of said diverse plant container, comprising:
   a ground-engaging pad having a plant container support;
   a telescopic support of variable length, coupled at a first end to said ground-engaging pad;
   a pot upper rim retention arm coupled with said telescopic support distal to said ground-engaging pad which operatively passes within a sidewall of said diverse plant container when said telescopic support is contracted to thereby capture said diverse plant container between said ground-engaging pad and said pot upper rim retention arm, and which operatively is extracted from within said diverse plant container sidewall when said telescopic support is expanded to thereby release said diverse plant container;
   a transformer encompassing pot forming a plant support container adjacent to said ground-engaging pad and distinct from said diverse plant container; and
   a lamppost connector adjacent to said pot upper rim retention arm.

2. The telescopic light base of claim 1, wherein said plant container support further comprises a top surface of said ground-engaging pad.

3. The telescopic light base of claim 2, wherein a plant container supported upon said plant container support assists in anchoring said telescopic light base.

4. The telescopic light base of claim 1, wherein said telescopic support of variable length further comprises a pole.

5. The telescopic light base of claim 1, wherein said ground-engaging pad further comprises a planar base, and said telescopic support extends in a direction normal therefrom.

6. The telescopic light base of claim 1, wherein said transformer encompassing pot further comprises a sealed chamber housing a transformer at a base of said plant support container adjacent to said ground-engaging pad.

7. The telescopic light base of claim 6, wherein said transformer encompassing pot further comprises a soil container adjacent to said sealed chamber.

8. A telescopic light base which couples a decorative light fixture to a diverse plant container, in further combination with said diverse plant container having a bottom, sidewalls and an open top, so that said decorative light fixture may then illuminate a content of said diverse plant container, comprising:
   a generally planar ground-engaging pad having a plant container top support surface;
   a telescopic pole support of variable length extending generally normal to said generally planar ground-engaging pad and secured at a first end to said ground-engaging pad;
   a pot upper rim retention arm coupled with said telescopic support distal to said ground-engaging pad engaged with a sidewall of said diverse plant container when said telescopic support is contracted to thereby capture said diverse plant container between said ground-engaging pad and said pot upper rim retention arm, and disengaged from said diverse plant container sidewall when said telescopic support is expanded to thereby release said diverse plant container;
   a lamppost connector adjacent and secured to said pot upper rim retention arm;
   a lamppost connected to said lamppost connector and restrained to extend longitudinally in a vertical direction by said generally planar ground-engaging pad and said pot upper rim retention arm; and
   a lamp supported upon said lamppost.

9. The telescopic light base of claim 8, wherein said pot upper rim retention arm is operatively extracted from within said diverse plant container sidewall when said telescopic support is expanded to thereby release said diverse plant container.

10. The telescopic light base of claim 8, further comprising a spring coupling between said pot upper rim retention arm and said telescopic pole support of variable length.

11. A telescopic light base which couples a decorative light fixture to a diverse plant container, in further combination with said diverse plant container having a bottom, sidewalls and an open top, so that said decorative light fixture may then illuminate a content of said diverse plant container, comprising:
   a generally planar ground-engaging pad having a plant container top support surface;
   a telescopic pole support of variable length extending generally normal to said generally planar ground-engaging pad and secured at a first end to said ground-engaging pad;
   a pot upper rim retention arm coupled with said telescopic support distal to said ground-engaging pad engaged with a sidewall of said diverse plant container when said telescopic support is contracted to thereby capture said diverse plant container between said ground-engaging pad and said pot upper rim retention arm, and disengaged from said diverse plant container sidewall when said telescopic support is expanded to thereby release said diverse plant container;
   a spring coupling between said pot upper rim retention arm and said telescopic pole support;
   a lamppost connector adjacent and secured to said pot upper rim retention arm;
   a lamppost connected to said lamppost connector; and
   a lamp supported upon said lamppost.

* * * * *